US008295257B2

(12) United States Patent
Chen et al.

(10) Patent No.: US 8,295,257 B2
(45) Date of Patent: Oct. 23, 2012

(54) SCALABLE DISRUPTIVE-RESISTANT COMMUNICATION METHOD

(75) Inventors: Wai Chen, Parsippany, NJ (US); Jasmine Chennikara-Varghese, Somerset, NJ (US); Rama Vuyyuru, Somerset, NJ (US); Ryokichi Onishi, Jersey City, NJ (US)

(73) Assignees: Telcordia Technologies, Inc., Piscataway, NJ (US); Toyota Infotechnology Center, U.S.A, Inc., Palo Alto, CA (US)

( * ) Notice: Subject to any disclaimer, the term of this patent is extended or adjusted under 35 U.S.C. 154(b) by 579 days.

(21) Appl. No.: 12/403,571

(22) Filed: Mar. 13, 2009

(65) Prior Publication Data
US 2010/0232404 A1 Sep. 16, 2010

(51) Int. Cl.
*H04J 3/16* (2006.01)
(52) U.S. Cl. ....................................... 370/338
(58) Field of Classification Search .................. 370/338, 370/349, 235
See application file for complete search history.

(56) References Cited

U.S. PATENT DOCUMENTS

| | | | | |
|---|---|---|---|---|
| 6,385,454 B1* | 5/2002 | Bahl et al. | | 455/450 |
| 7,085,637 B2* | 8/2006 | Breed et al. | | 701/38 |
| 7,230,918 B1* | 6/2007 | Maiya et al. | | 370/229 |
| 7,301,897 B2* | 11/2007 | Lutgen et al. | | 370/229 |
| 7,336,607 B2* | 2/2008 | Samadi et al. | | 370/230.1 |
| 7,792,121 B2* | 9/2010 | Thompson et al. | | 370/395.4 |
| 7,986,264 B2* | 7/2011 | Shen et al. | | 342/357.35 |
| 2003/0120793 A1* | 6/2003 | Marjola | | 709/231 |
| 2004/0073361 A1* | 4/2004 | Tzamaloukas et al. | | 701/210 |
| 2007/0035528 A1* | 2/2007 | Hodge | | 345/174 |
| 2007/0146162 A1 | 6/2007 | Tengler et al. | | |
| 2007/0197231 A1* | 8/2007 | Lin | | 455/456.1 |

OTHER PUBLICATIONS

The International Search Report dated Sep. 30, 2009.
WO 2007/044881 A2 Yaqub published Apr. 19, 2007.
WO 2006/076349 A2 Cai et al published Jul. 20, 2006.

* cited by examiner

*Primary Examiner* — Mark Rinehart
*Assistant Examiner* — Mohammad Anwar
(74) *Attorney, Agent, or Firm* — Philip J. Feig

(57) ABSTRACT

A method for transmitting data in vehicular network comprising determining a communication window between at least two nodes, grouping a plurality of fragments of content together into an aggregate fragment block, forwarding the aggregate fragment block to a target node and assembling the plurality of fragments into the content. The content is divided into the plurality of fragments. A fragment signature is generated for the fragments that contain fragment index information regarding each fragment. Each fragment is unambiguously identified by its signature. A number of fragments grouped into the aggregate fragment block is dependent on the communication window.

15 Claims, 15 Drawing Sheets

*FIG. 15*

| INDEX | CACHE TIME | TRAJECTORY | CONTENT |
|---|---|---|---|
| 1 | 10s | NORTH OF (x,y) | |
| 2 | 10h | 10m RADIUS OF (x,y) | |
| 3 | 20M | NONE | |
| ⋮ | ⋮ | ⋮ | |
| N | Xsec | WEST OF (x,y) | |

1500

SCALABLE DISRUPTIVE-RESISTANT COMMUNICATION METHOD

FIELD OF INVENTION

This invention relates to ad-hoc communication network in a mobile environment. More specifically, the invention relates to system and method for message exchange between vehicles and vehicle-to-RSUs in a presence of highly sporadic network connectivity.

BACKGROUND

Mobile ad-hoc networks have become increasingly important in areas where deployment of communication infrastructure is difficult. A mobile ad-hoc network (MANET) is formed by multiple moving nodes equipped with wireless transceivers. The mobile nodes communicate with each other through multi-hop wireless links. Each node can transmit and receive information.

One type of MANET is a vehicular ad-hoc network (VA-NET) that refers to a mobile ad-hoc network designed to provide communications among nearby vehicles and between vehicles and nearby road-side units.

The high mobility and lack of inherent relationships between vehicle nodes make a priori configuration of vehicle nodes into groups problematic. Information such as traffic advisories, Amber alerts, road condition advisories, and weather advisories, etc. should be relayed to all vehicles quickly, with minimal delay and interference. Additionally, if the fixed equipment, such as a road-side unit, is sporadically deployed, communication via the road-side units and the vehicles node could be highly intermittent. Each vehicle does not have a long duration for the network link between another moving vehicle or a road-side unit. A vehicle can only communicate with another vehicle or road-side unit when the vehicle is in radio communication range of the road-side unit or other vehicle. Since the vehicles are moving at high speeds, the communication duration are normally short and highly variable.

Accordingly, there is a need for a communications network and method that support vehicle-to-vehicle and vehicle-to-RSUs communication in such a disruptive environment.

SUMMARY OF THE INVENTION

Accordingly, disclosed is a method for transmitting data in vehicular network. The method comprises determining a communication window between at least two nodes, grouping a plurality of fragments of content together into an aggregate fragment block forwarding the aggregate fragment block to a target node and assembling the plurality of fragments into the content. The fragments can be grouped based upon a priority of each fragment.

The fragment size of a fragment is variable and is based upon an average communication window and bandwidth of wireless network. The number of fragments grouped into the aggregate fragment block depends on the communication window.

The communication window is a communication time for transmission between a nearby node and the target node. The communication window is calculated using a speed of a data link, a radio communication range, and a direction of motion and speed of the target node and the nearby node.

The method further comprises a step of receiving a request for the content. The request includes a fragment signature, the target node's current position, a direction of motion and speed of the target node.

The method further comprises the step of determining a predicted trajectory of the target node. The predicted trajectory of the target node is inferred from a location of each road-side unit (RSU) in radio communication with the target node. Alternatively, the predicted trajectory is calculated from speed and direction information.

The method further comprises dividing the content into the plurality of fragments and generating a fragment signature that contains fragment index information regarding each fragment. Each fragment is unambiguously identified by its signature. The fragment index information from the signature is stored in memory.

The method further comprises verifying an authenticity of each of the forwarded fragments, and storing each of the forwarded fragments, based upon the verification. Each of the received fragments is identified by a signature.

The method further comprises determining local storage lifespan for each fragment. The fragment is removed from storage when the lifespan expires.

The method further comprises assigning a fragment trajectory for each fragment.

Additionally, disclosed is a method for transmitting data in a mobile ad-hoc network comprises dividing data into fragments, creating a fragment signature containing a fragment index, determining a window of communication based upon an allowed communication time between two nodes, grouping the fragments into aggregate fragment blocks, and transmitting the aggregate fragment blocks. Each fragment block has a block size determined by the window of communication.

The method for transmitting data further comprises transmitting the fragment signature. The method for transmitting data further comprises receiving a request for a fragment listed in the fragment signature.

BRIEF DESCRIPTION OF THE DRAWINGS

These and other features, benefits, and advantages of the present invention will become apparent by reference to the following figures, with like reference numbers referring to like structures across the views, wherein:

FIG. 15 illustrates an exemplary cache table according to an embodiment of the invention.

DETAILED DESCRIPTION OF THE INVENTION

Definitions

Figure 1:
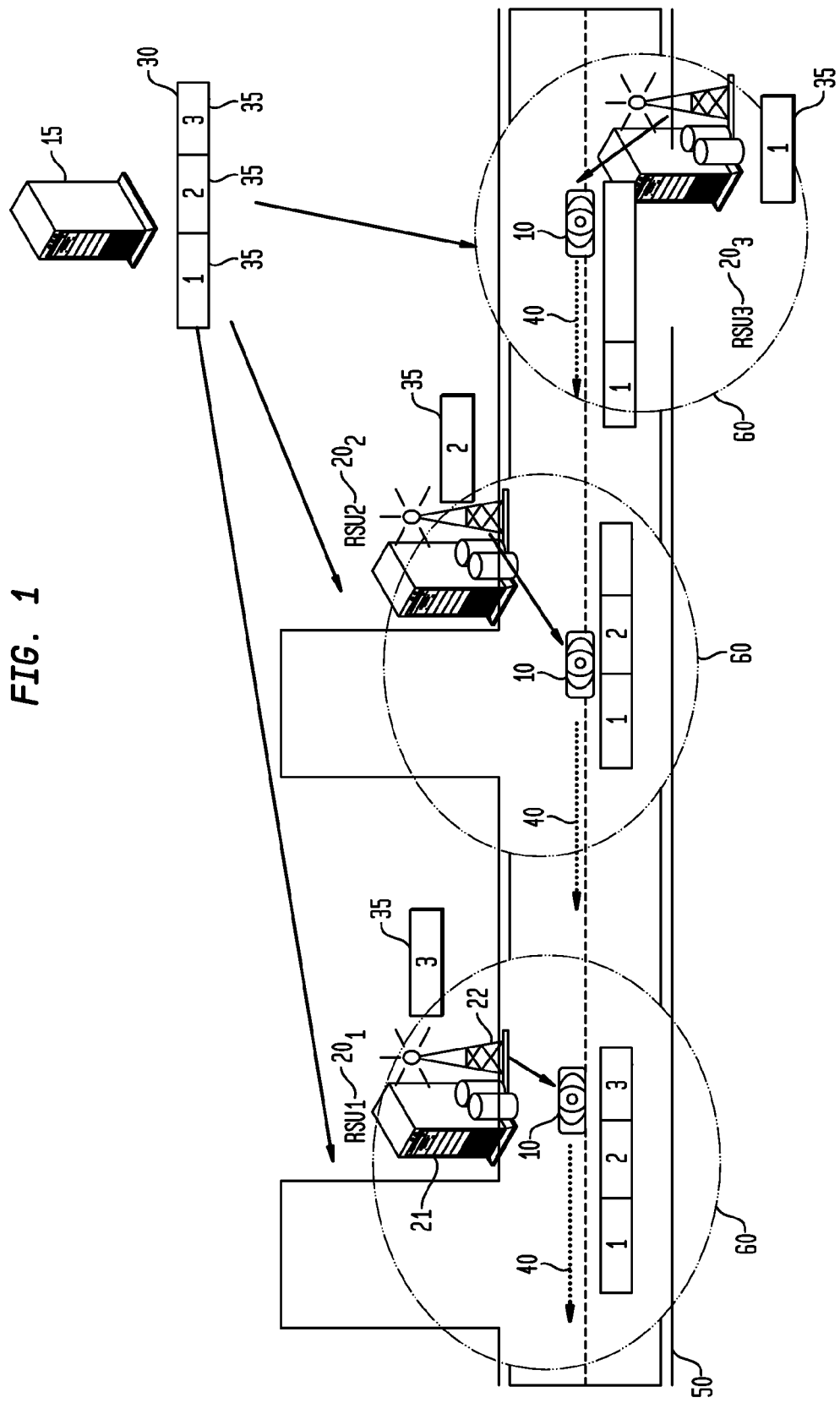
FIG. 1 illustrates an exemplary ad-hoc wireless network according to an embodiment of the invention.

A "Node" is a mobile router which implements the transmission protocol or method as specified in the following description. For example, a moving vehicle having a communication device is a node. A node can be a fixed node or a moving node.

A "roadside unit (hereinafter "RSU")" is a network node that is fixed. The RSU is located along the side of a roadway. The number of RSU used in the network will depend on several factors such as the range of the radio antenna of the RSU, desired communication range, number of moving devices, topology of the land, the environmental conditions, traffic patterns and population density. A RSU has a fixed communication range. RSU has many functions such as a router, an applications server or a combination thereof. The RSU can route data to moving vehicles within its radio coverage. Furthermore, depending on the relative locations of the RSUs, the RSU can route data between other RSUs, e.g., R-R communication. Additionally, the RSU can route data from/to the backbone, e.g., route data from backbone to the moving vehicle.

A "Content Server" is a backbone device that serves as a central repository for content. The content server can communicate with each RSU.

A "neighboring node" or "neighboring vehicle" means that there is a direct link between two nodes. A node X is a neighboring node of node Y if node Y can hear node X.

A "hop" is a number of nodes in which a message is relayed. The hop count for a neighboring node is 1.

According to the invention, a message, i.e., content 30 is divided into fragments 205 for forwarding. The fragment 205 are shared by nodes within the network 1 and forwarded to a destination node or target node. Since the content 30 is fragmented, different nodes may have different parts of the content 30. The fragments 205 are grouped together to form an aggregate fragment block 35 for forwarding. The size of the aggregate fragment block 35 depends on an estimated connection time for a communication link.

Each node makes a decision on using a specific forwarding node to route the aggregate fragments towards a destination node or target node based upon the predicted route trajectory of a neighboring nodes and the location of the destination node or target node.

FIG. 1 illustrates an exemplary ad-hoc network 1 according to the invention. The ad-hoc network includes a plurality of RSUs, generally referenced as "20", a moving vehicle 10 and a content server 15. As depicted, there are three RSUs $20_1$-$20_3$. The RSUs 20 are located along a roadway 50. The shaded circle represents the radio communication range 60 for each RSU $20_1$-$20_3$. Additionally, as depicted, the RSUs 20 are sporadically located such that the RSUs 20 cannot directly communicate with each other. Each RSU 20 can be used to communicate with moving vehicles 10 traveling either alone or a group of vehicles.

RSU 100 includes a server 21 and router 22. The server 21 is used to store content 30 from passing moving vehicles 10 or from the content server 15. In an embodiment, the RSU 20 includes at least three network hierarchical layers: network layer, a MAC layer and a physical layer. The physical layer includes devices such as hubs, repeaters and wireless radios. The physical layer functions include the transmission of signals, representing the high layer data, over a communications channel such as the physical radio link. U.S. patent application Ser. No. 11/585,047 filed on Oct. 23, 2006 describes a RSU 20 which is hereby incorporated by reference. The MAC Media Access Control) layer handles the procedures for transferring data between network entities and to detect and possibly correct errors that may occur in the physical layer. For example, in IEEE 802.11 the MAC layer manages and maintains communications between 802.11 stations (radio network cards and access points) by coordinating access to a shared radio channel and utilizing protocols that enhance communications over a wireless medium. The 802.11 MAC layer uses an 802.11 Physical (PHY) Layer, such as 802.11b or 802.11a or 802.11p, to perform the tasks of carrier sensing, transmission, and reception of 802.11 frames.

The network layer performs functions for end-to-end communication among network entities. The network layer discovers and maintains unicast/multicast routes as data paths and also provides data delivery methods among end users in accordance with the unicasting and multicast procedures. The described protocol and method can be implemented using the network layer. Alternative, a separate network layer is used to implement the described protocol.

Figure 1A:
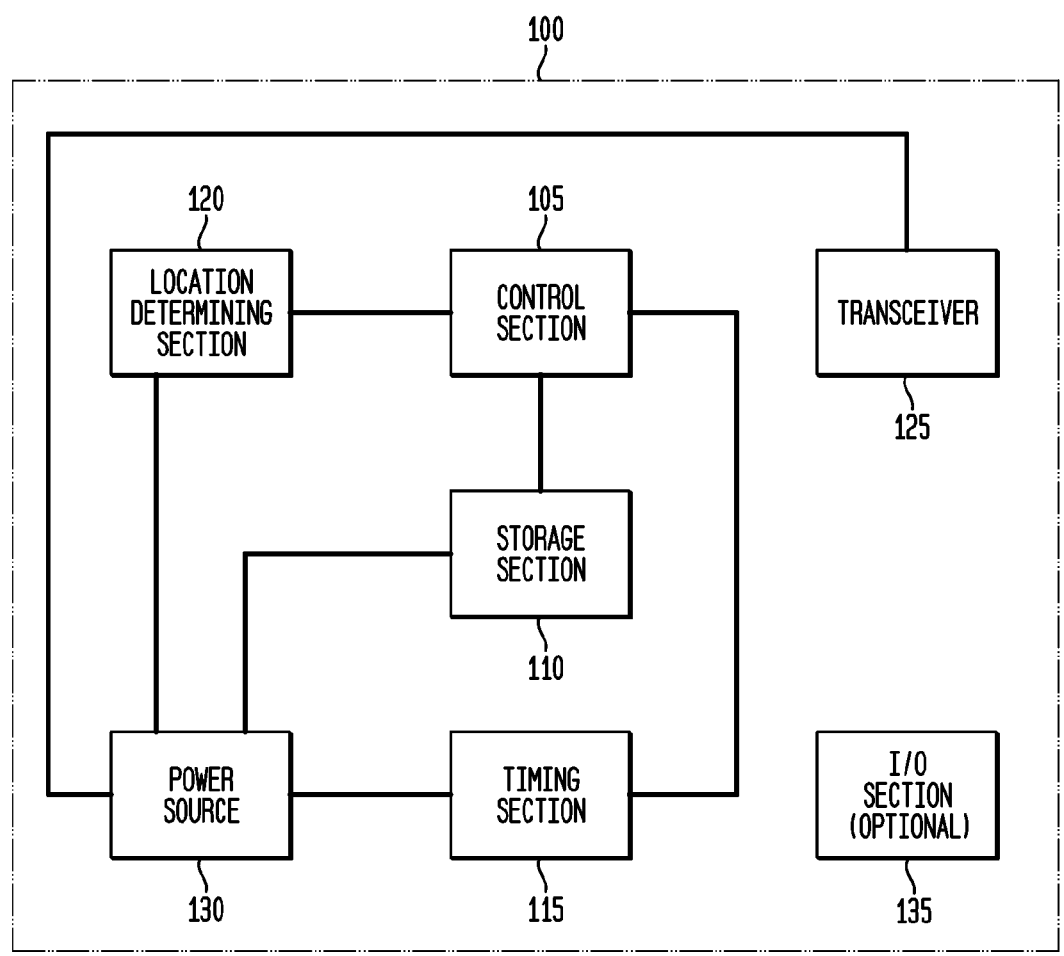
FIG. 1A illustrates an exemplary wireless communication device which is used by a moving vehicle according to the invention.

The moving vehicle 10 (and RSU 20) includes a communication device 100. FIG. 1A illustrates an example of a wireless communication device which is used by the moving vehicle 10. The communications device 100 can be attached to, embedded in or used in combination with the moving vehicle 10 and RSU 20.

The communications device 100 includes a computing device or control section 105, a storage section 110, a timing section 115, a location determining section 120, a transceiver 125 and a power source 130. The transceiver 125 is for providing wireless communication between other moving vehicles 10 and itself or an RSU 20.

The control section 105 can be any type of controller such as, but not limited to, a microcontroller or a microprocessor. The control section 105 provides operational control by executing instructions, which have been programmed. A storage section 110 is disposed within the computing device 100 and in operational communication with the control section 105. The storage section 110 may be memory modules, removable media or a combination of multiple storage devices, etc., and is configured to store the processor-executable instructions necessary for the performance of the methods and protocols described herein.

Further, at least one timing section 115 is provided either as a separate component or in the controlling section 105. As depicted, the timing section 115 is a separate component. The timing section 115 provides the time interval tracking necessary for each of the timing section 115 referred to in the described embodiments, such as, but not limited to broadcasting signals to other nodes and content tracking such as timestamps and timing a content lifespan. The signals include the current location, time of broadcast, stored fragments and any fragment signatures (content).

The communication device 100 can also include a location determining section 120 such as a GPS device. Alternatively, the location determining section 120 can be external such as one located in a moving vehicle and the location information transmitted to the communication device 100 through an I/O section 135. Additionally, other location information such as a compass direction and speed can also be transmitted to the communication device 100 from the moving vehicle via the I/O section 135.

A power source 130 is electrically connected to all the components of the communications device 100 for providing operational power to the components as necessary. The communications device 100 further includes an internal clock that maintains a clock for the device and is used as the timestamp for all messages.

The processor-executable instructions for performing the described embodiments may be embedded in the storage section 110 in a form such as an EPROM, Flash memory or other such non-volatile storage. Additionally, the processor-executable instructions may be stored on a computer readable media such as an optical or magnetic medium, or may be downloadable over a network (e.g., Internet). Preferably, a user, as necessary, can periodically update the processor-executable instructions in order to provide additional enhancements to the system as they become available.

Each communications device 100 is assigned a unique identifier to facilitate the transmission and reception of messages over the ad-hoc network. The unique identifier can be any number that is uniquely assigned to the communications device 100 so that no device within a specific area has the same unique identifier. This identifier must be assigned quickly to support immediate communication, if necessary. The unique identifier can be any unique number or address that facilitates communication, such as a MAC address, VIN number or IP address, and this identifier is used as the node's identifier. Any moving vehicle with the communications device 100 can be a node of the ad-hoc network.

According to the invention, the moving vehicle 10 receives aggregate fragments 35 of the content 30 as the moving vehicle travels along the roadway 50. The moving vehicle 10 receives certain parts of the content 30 from different nodes, e.g., RSUs $20_1$-$20_3$ or other moving vehicles 10n. The moving vehicle 10 is moving in a projected direction 40 from RSU3 $20_3$ towards RSU2 and RSU1 $20_2$, $20_1$. As depicted, the moving vehicle 10 received aggregated fragment 35 (1) from RSU3 $20_3$, aggregated fragment 35 (2) from RSU2 $20_2$, and aggregated fragment 35 (3) from RSU1 $20_1$.

Figure 2:
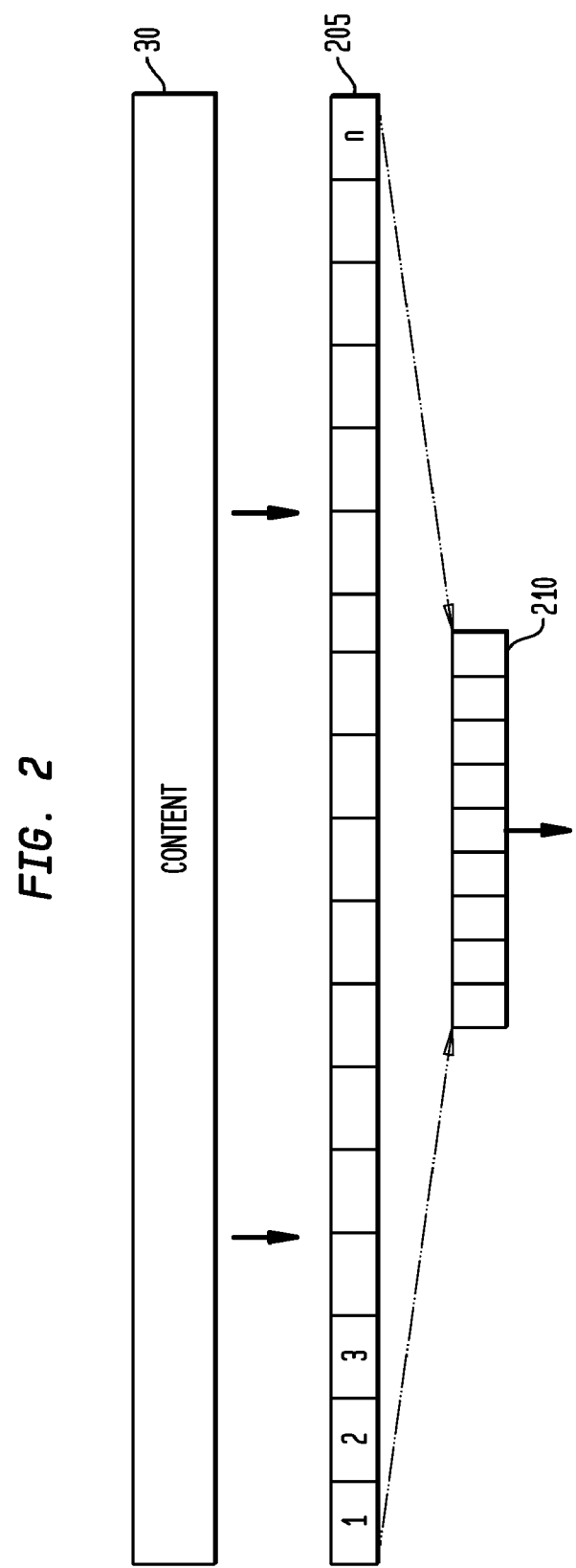
FIG. 2 illustrates an exemplary message content and fragmentation.

The content 30 is divided into multiple fragments 205. Each fragment 205 is assigned an unambiguous identifier. In an embodiment, the fragment identifier is a hash-based signature. The fragment signature serves as a locator for the fragment 205. FIG. 2 illustrates an example of the fragmentation. The content 30 is separated into fragments 205. A fragment signature 210 is created from the fragments 205. The size of each fragment 205 depends on an average communication window time and wireless bandwidth. The average communication window time is determined based upon a past history of communications within the area. An RSU 20 maintains this information. This is an engineering parameter can be adjusted based on given road conditions. The content fragmentation is performed by either an RSU 20 or authorized moving vehicles 10 such as police vehicles. The fragment size remains fixed during content dissemination. Once the fragment signature 210 is created, the signature 210 is broadcast to RSUs 20 and moving vehicles 10. After, the fragment signature 210 is received; a node, e.g., moving vehicles 10 or RSUs 20 can send a specific request for a unique fragment identifier (signature 210) and receive the corresponding content fragment 205. All information to identify the appropriate content and the appropriate fragment of the content 30 is contained in the content fragment signature 210.

Figure 3:
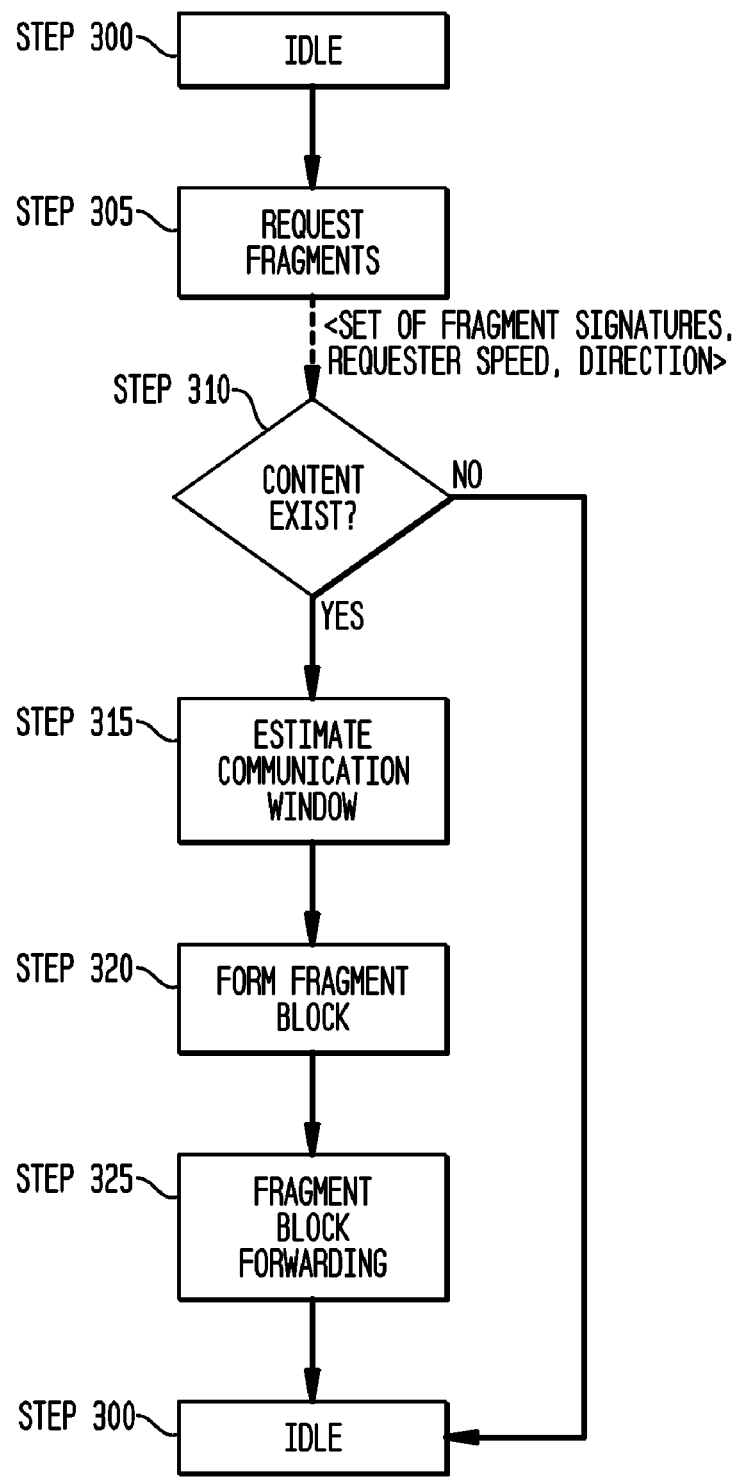
FIG. 3 illustrates a flow chart for a poll based fragmentation exchange according to an embodiment of the invention.

FIG. 3 illustrates a method for distributing content according to an embodiment of the invention. When a node, e.g., moving vehicle 10 or RSU 20 encounters a nearby node such as another moving vehicle or a RSU 20, node ("Requesting Node") sends a Content Index Request. The Content Index Request is broadcast to the nearby nodes. The nearby node responds to the Content Index Request by broadcasting a fragment signature 210. The Requesting Node receives the fragment signature 210 and uses it to locate and select the desired content.

From the fragment signature 210, the Requesting Node knows which fragments are available for exchange. At step 305, the Requesting Node selects specific fragments from the fragment signature 210 and transmits a fragment request to the Content Source. The fragment request includes the selected fragment identifiers, the moving vehicle's speed, and direction of travel derived from a position determining device or location device such as, but not limited to a GPS device. The moving vehicle's speed and direction of travel is used to predict a trajectory for the moving vehicle and estimate communication window time. In another embodiment, the initial Content Index Request includes the moving vehicle's speed and direction of travel and the fragment request includes the updated speed and direction of travel. A change of position is directly calculated from the information received in both requests.

At step 310, the Content Source (receiver node) checks whether the corresponding content, i.e., fragments 205 (represented by this signature) are available locally. If the content 30, i.e., fragments 205 are available locally, the Content Source (receiver node), estimates an expected communication window based on the relative speed and direction between the Content Source and Requesting Node, at step 315. The estimation of the communication window (opportunistic communication time) will be described further with respect to FIG. 11 step 1120. Based on the estimated window time, a fragment block 35 with a proper size is constructed locally (at step 320), and then is transmitted to the Requesting Node, a step 325. The fragment block (consisting of multiple fragments) will be described further in step 1125.

In another embodiment, the Content Source determines if the Requesting Node is in a content Relevant Location. Specific fragments 205 are only relevant to moving vehicles 10 that are traveling in the same/different direction. If determining the relative direction of the moving vehicle 10, unnecessary fragment transmission is avoided. For example, collision information is only relevant to moving vehicles that are behind the collision. Furthermore, exit information, such as exit closures is only important to a vehicle that has not passed the exit. The Content Source determines if the Requesting Node is in a content relevant direction by comparing a Requesting node's current location (or a predicted trajectory for the Requesting Node) with a content Trajectory associated with the fragments 205.

In another embodiment, instead of polling a Content Source for the content 30 or fragments 205, the content 30 can be pushed to a node, e.g., moving vehicle 10 or RSU 20 from the Content Source.

Figure 5:
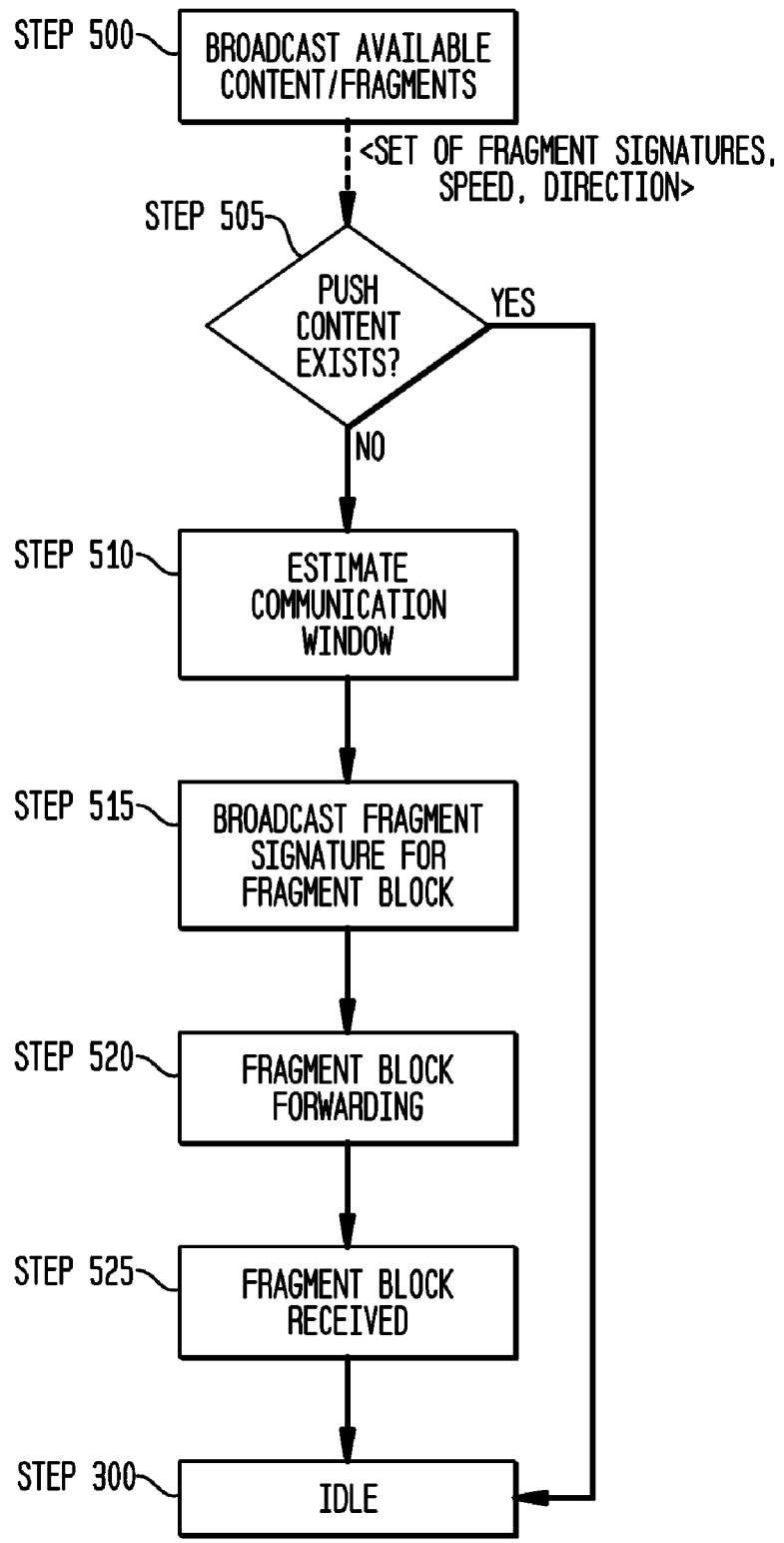
FIG. 5 illustrates a flow chart for a push based fragmentation exchange according to an embodiment of the invention.

FIG. 5 illustrates a method of pushing the content 30 to a moving vehicle 10 or RSU 20 from the Content Source. In the push method, the Content Source, e.g., moving vehicle 10 or RSU 20 broadcasts fragment signatures 210, and its speed and direction of travel, at step 500 to passing vehicles. The underlying MAC layer will sense a nearby node, i.e. 802.11 carrier-sensing. This will trigger the push. Alternatively, the Content Source can periodically broadcast this information.

A neighboring node nearby, e.g., moving vehicle 10 or RSU ("Content Destination"), first checks its cache table (e.g., 1500) for the content 30 and fragments 205 identified by the corresponding fragment signature 210, at step 505. If the content 30 and fragments 205 are already in the cache table, e.g., 1500, the Content Destination, returns to an idle state (300). If the content 30 and fragments 205 are not stored in the cache table e.g., 1500, the Content Destination uses the direction of travel and speed (of the Content Source) to estimate a communication window, at step 510. The estimation of the communication window (opportunistic communication time) will be described further in step 1120. Based on the estimated window time, the Content Destination broadcasts a request for a fragment block at step 515. The request includes a fragment signature 210 for all of the fragments 205 requested. The number of fragments requested is related to the estimated communication window. In an embodiment, the request includes a maximum account of fragments that can be transmitted within the estimated communication window. The Content Source receives the request and broadcasts all of the fragments 205 that correspond with the fragment signature 210 contained in the request, at step 520. The fragments 205 are aggregated into a fragment block 35 and forwarded to the Content Destination. Aggregate fragment forwarding is described in FIG. 12. The fragment block 35 is received at step 525.

Figure 4:
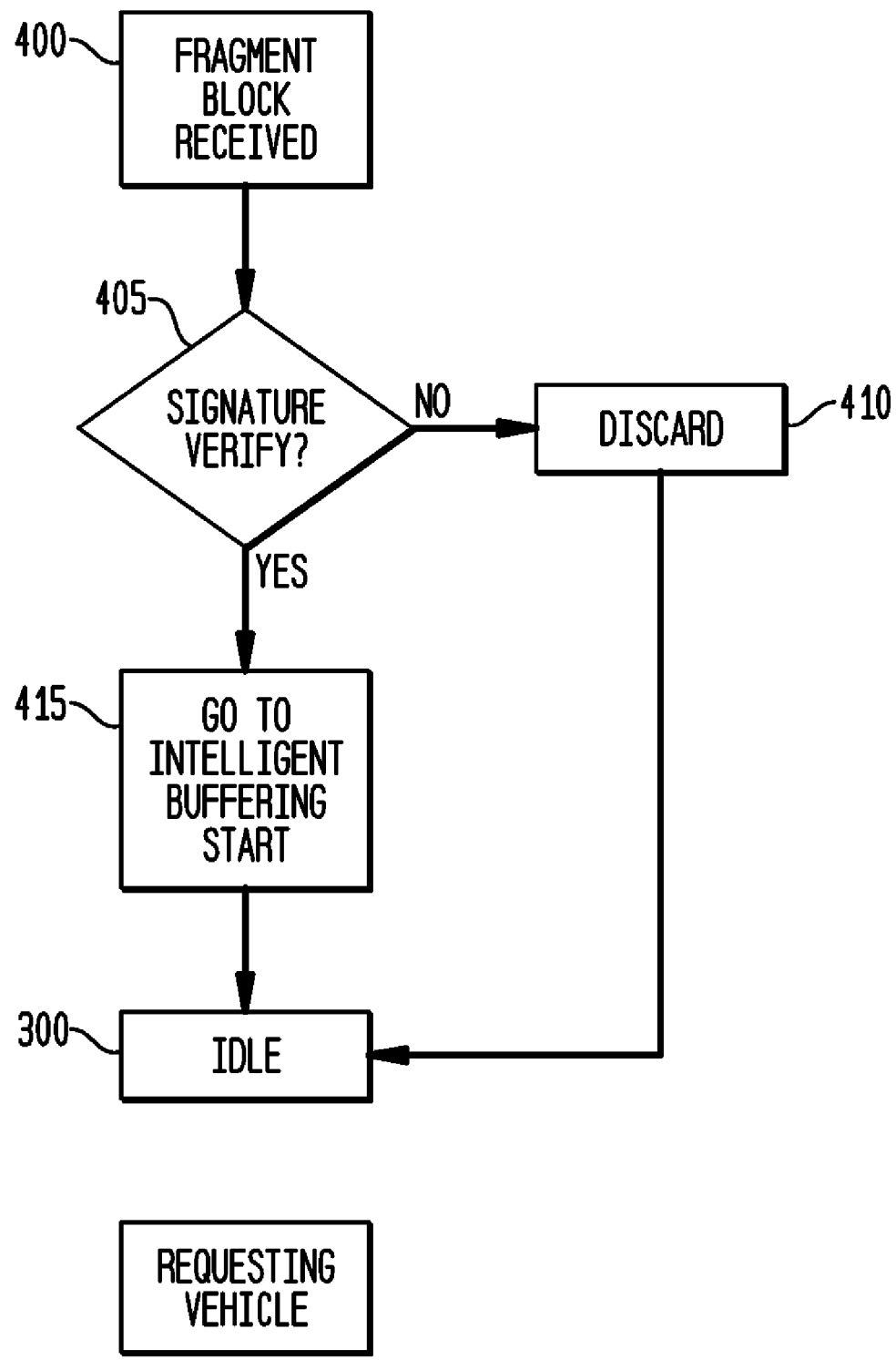
FIG. 4 illustrates a flow chart for a fragmentation exchange for a target vehicle according to an embodiment of the invention.

FIG. 4 illustrates function blocks for the Requesting Node or Content Destination when receiving the fragments 205 or fragment block 35. At step 400, the Requesting Node or Content Destination receives the aggregate fragment block 35. The aggregate fragment block 35 includes at least one fragment 205. Prior to storing, the Requesting Node or Content Destination determines if the data contained in the aggregate fragment block 35 is authentic. Additionally, if the Requesting Node or Content Destination is an RSU 20, the RSU determines if the Content Source is authorized to deposit or store content in the RSU 20. The verification and authorization is performed at step 405. The verification and authorization is described in detail in FIGS. 8 and 9.

If the content 30 in the aggregate fragment block 35 is not authentic or not authorized to be stored, the aggregate fragment block 35 is discarded at step 410. The Requesting Node or Content Destination returns to an idle state at step 300. If the content 30 in the aggregate fragment block 35 is authentic and is authorized to be stored, the process moves step 415 and the content 30 in the aggregate fragment block 35 (fragments 205) are buffered according to an intelligent buffering procedure (step 415). The buffering procedure will be described in detail with respect to FIG. 14.

The fragment exchange described above between nearly moving vehicles 10 and RSUs 20 may not always be sufficient to obtain all of the needed content 30 and fragments 205. Therefore, a node, e.g., moving vehicle 10 or RSU 20 may need to specifically query for missing fragment 205 and contents 30.

The extend fragment query method uses intermediary nodes, e.g., moving vehicles 10 and RSUs 20 as forwarding or relay nodes (e.g., moving vehicles) for the queries and the fragments. Each moving vehicle 10 and RSU 20 maintains and tracks the available content 30 and fragments 205 for the content using the fragment signature 210. One-hop neighbor nodes receive this information. In an embodiment, each node, e.g., moving vehicle 10 and RSU 20 periodically broadcasts its identifier, speed, location or direction of travel and fragment signature 210. The fragment signature 210 received from all one-hop neighboring nodes is aggregated and used to build a global fragment signature. Once the fragment signature is constructed, the node, e.g., moving vehicle 10 or RSU 20 broadcast the fragment signature 210. The fragment signature 210 is continuous updated such that all of the nodes, within a given area can have access to the same content fragment signature as a complete list of available content and fragments.

In an embodiment, each node, e.g., moving vehicle 10 and RSU 20 builds a local routing table for at least one-hop neighboring nodes and routing to a RSU 20, i.e., next hop to the RSU. The routing table includes at least a list of all neighboring nodes that have a link, i.e. that are in radio communication range. When the nodes receive the periodic broadcasts, the node updates the routing table with the hop information and identifier for the node. Any nodes within radio communication range of the broadcasting node will receive the broadcast message and senses a link. Each period, the nodes check the status of the connectivity for each link. In an embodiment, the routing table also includes the location, speed and direction of travel of the neighboring nodes collectively referenced as "tracking parameters." The routing table is used by intermediary nodes to forwarding the fragment queries towards possible content sources (query path) and route the requested fragments back to the requesting node.

When a node, e.g., moving vehicle 10 or RSU 20 receives a query of a requesting node, the node first determines if the content (fragments) are stored locally, i.e., buffered. If not, the node forwards the query along a query path towards a known content server 15 or another node that is likely to have the fragments 205, e.g., content server, RSU 20 or authorized moving vehicle. The query path is determined using the predicted trajectory/location of known content server or another node likely to have fragments 205. Queries are forwarded to and carried by intermediate nodes which follow a trajectory toward this other node. Each node maintains a history of a fragment index. In an embodiment, the node notifies the query node that the query has been forwarded to another node.

If the content is locally available, the node performs an aggregation of the fragments. Specifically, if the fragments are locally available, the node performs adaptive fragment block sizing to aggregate the fragments for forwarding. The adaptive fragmentation block sizing is described in FIGS. 10-11. The fragments are aggregated and forwarded to the querying node. Aggregate fragment forwarding is described in FIG. 12.

The query includes the fragment signature 210, the identifier of the querying node, and a predicted route trajectory for the querying node. In an embodiment, the query has a maximum hop count for the query to be forwarded, e.g., a time-to-live value. The forwarding hop count for the query is tracked. The maximum hop count for the query is used to keep the query within a radius of presence of the query node.

Each node tracks the fragments 205 that are already stored or buffered locally. Content tracking is used such that fragment queries are not forwarded unnecessarily and to avoid redundant fragments from being broadcast multiple times. In an embodiment, the content is tracked by type of content scope such as a lifespan for the content. The lifespan is determined for the content by the content originator. Each node uses local information and timestamps for the timing. Furthermore, an event location and direction relevancy index can also be used. The content can be grouped with similar events or forwarding direction requirements. The content can be grouped by a content priority. Buffering is described in detail in FIG. 14.

When a fragment 205 is received, it is indexed and stored in a content table. The node, e.g., moving vehicle 10 or RSU 20 matches the received fragments with apriori known fragment signature and records that the fragment is received (and notes which fragments are missing).

Figure 6:
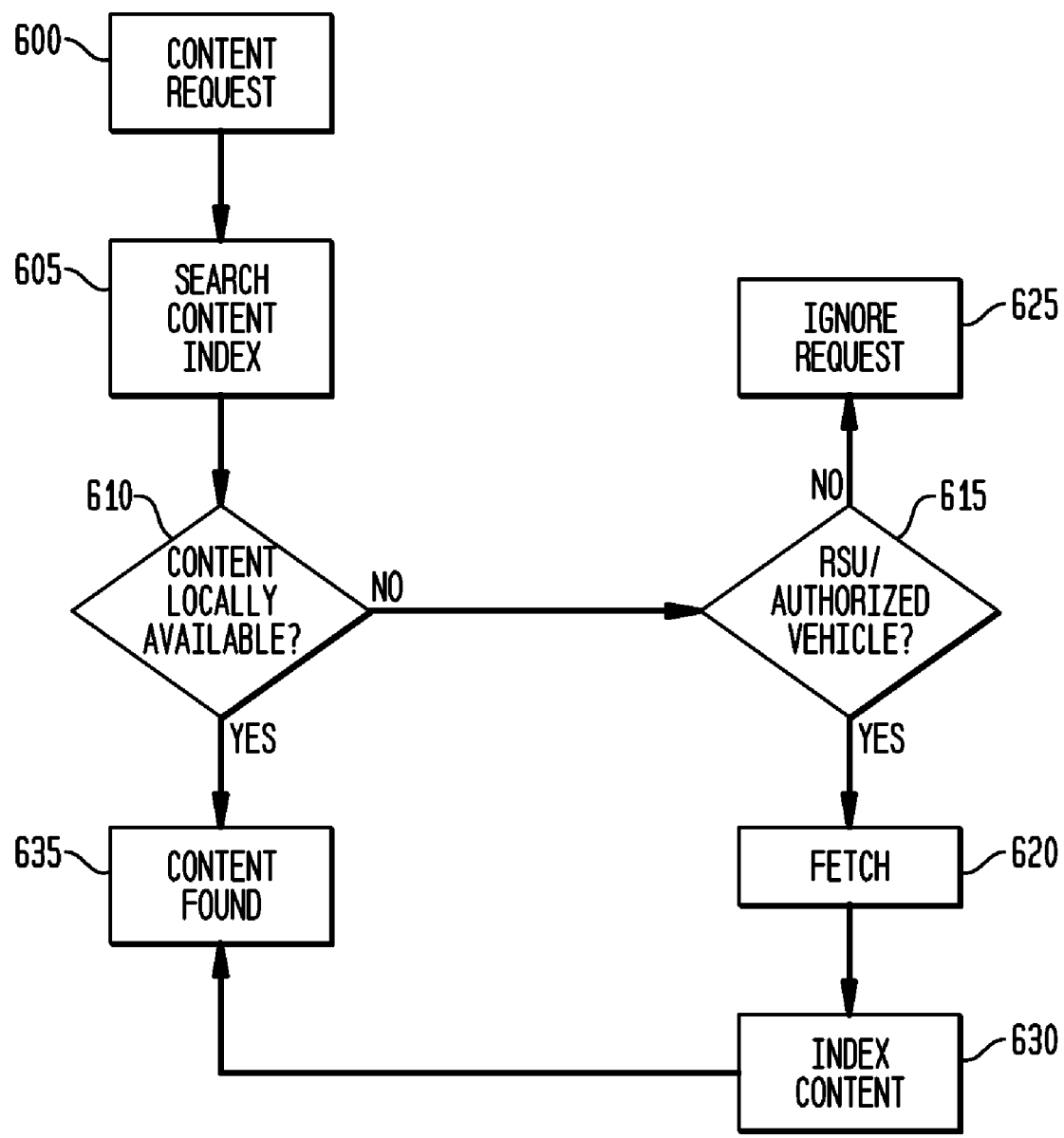
FIG. 6 illustrates a flow chart for content tracking according to an embodiment of the invention.
Figure 7:
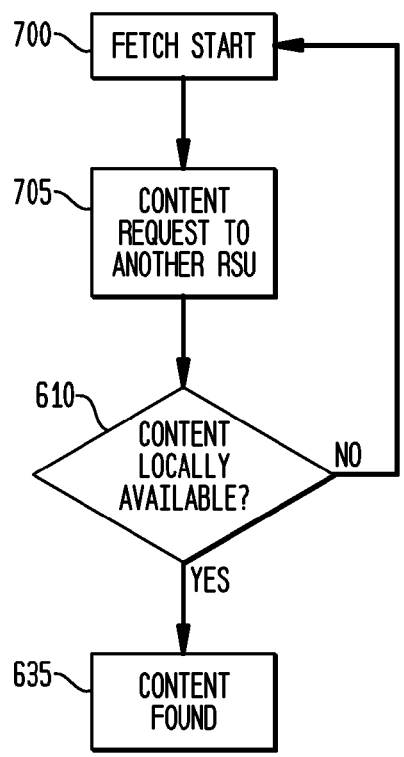
FIG. 7 illustrates a flow chart for fetching fragments according to an embodiment of the invention.

FIG. 6 illustrates a flow chart for content tracking. At step 600, a node, e.g., moving vehicle 10 and RSU 20 receives a specific request for content. At step 605, the node searches the global content fragment signature (content index) for the requested content. In step 610, the node determines if the content was found locally. The node matches the content with the content request. If the content is locally available, the node sets a content found flag at step 635 and then performs the fragment aggregation and forwarding which is described in detail later. If the content is not locally available, a determination is made whether the node is an authorized vehicle, content server 15 or RSU 20 at step 615. If the node is any of the above types, than the node performs content fetching, at step 620. If the content is not found locally by a regular vehicle then the content request is dropped, at step 625. Once the content is found, the content is index at step 630 and stored. Content fetching is described in FIG. 7.

At step 700, the fetching process starts. The node, e.g., RSU 20 broadcasts a content request for the missing content (s) to another RSU 20, at step 705. Content awareness is performed to maintain information about what content is locally stored. Awareness of the content locally stored will be used to determine if the specific content queried is locally available at the RSU at step 610. If not locally available the RSU can obtain the content 30 (from the backbone network or content server 15, in anticipation of a future request from a moving vehicle 10. In another embodiment, the content can be fabricated by a RSU 20 or another authorized moving vehicle. A duplicate content can be created.

Once the content (fragments) is received locally at the authorized vehicle or RSU, the content is stored and indexed at step 630. In an embodiment, the content source controls the scope of the content. The node stores the content according to the dictated scope. The buffering of the content will be described in detail in FIG. 14.

After the content is stored, the node performs an adaptive aggregation or block sizing for the fragments. The adaptive aggregation is described in FIGS. 10-11. The fragments are aggregated and forwarded to the requesting moving vehicle. Aggregate fragment forwarding is described in FIG. 12.

Each node e.g., 10, 15 or 20 checks to see of the received fragment(s) is/are valid and authentic. Additionally, the RSU 20 determines if the broadcasting node is authorized to store or deposit the fragment(s).

The broadcasting node signs the message to make if difficult for an unauthorized person to produce the same fragment signature 205. Additionally, the content or fragment authentication is required to make it difficult to alter or falsify the signed content without detection.

In an embodiment, the digital signature is created using a one-way hash function to form a fingerprint of the fragments. This supports easy tracking of the valid fragments. The digital signature is much smaller than the fragments 205. The digital signature is unique to the original content fragments. Any change in the fragments would result in a different signature. Additionally, for secure transmission of the fragments 205, the nodes can encrypt the fragments 205.

Figure 8:
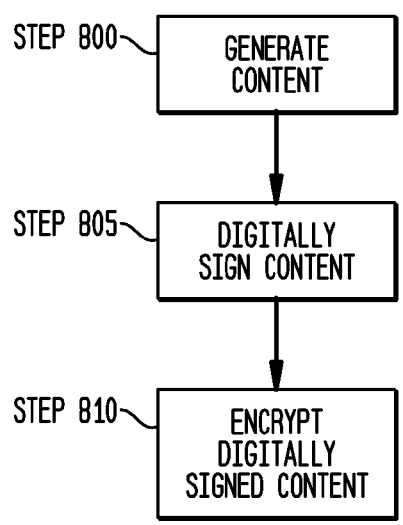
FIG. 8 illustrates a flow chart for generating a signed and secure fragment block according to an embodiment of the invention.

FIG. 8 illustrates a process of generating an authentic and secure content for transmission. As noted above, only certain nodes can generate content, e.g., RSU 20 or a sub-set of the moving vehicles such as a police vehicle or a content server 15. At step 800, the content 30 is generated. The content 30 is fragmented using the fragmentation process which will be described in detailed with reference to FIGS. 10 and 11. Once the content 35 is fragmented and grouped into fragment blocks 35, the data is digitally signed, at step 805. The digitally signed fragment block is encrypted at step 810. The digitally signed aggregated fragment block is encrypted using a private key 808 into an encrypted message. The encrypted message is forwarded to another node, e.g., moving vehicle 10 or RSU 20.

Figure 9:
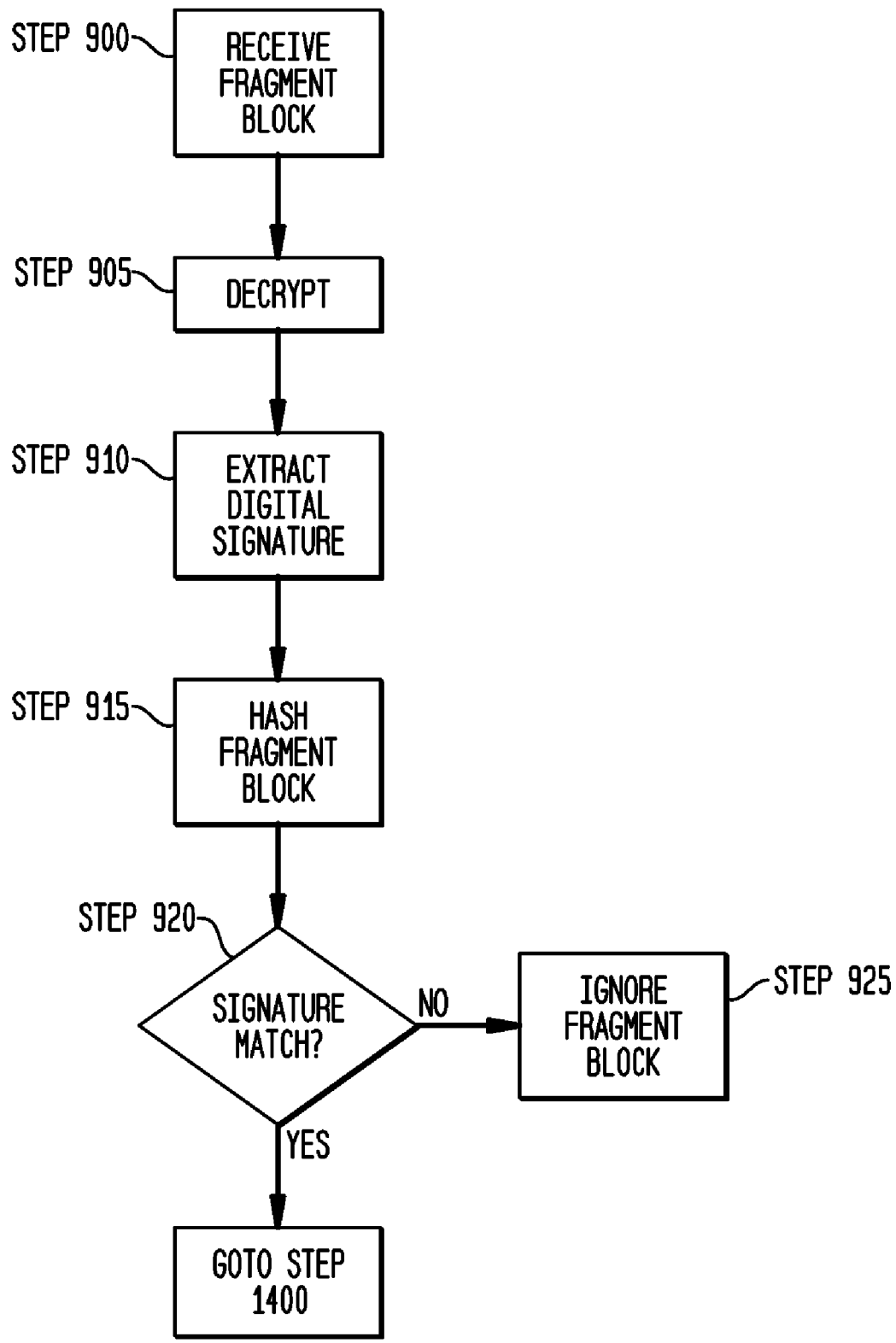
FIG. 9 illustrates a flow chart for an authentication of the fragment block and decryption according to an embodiment of the invention.

FIG. 9 illustrates a process of verifying and decrypting of the fragment block 35 according to the invention. At step 900, a receiving node receives an aggregate fragment block. The receiving node decrypts the message using a public key to obtain the digitally signed aggregate fragment block (step 905). The receiving node then separates the digitally signed message into a signature and aggregate fragment block, step 910. At step 915, the receiving node performs the same one-way hash function on the aggregate fragment block to verify the digital signature. If the two signatures match, the fragments 205 (fragment block 35) is/are authentic and valid. If the two signatures do not match, the fragments have been altered and are not authentic. At step 920, the newly created signature (at step 915) is matched with the signature from the Content Source or originator (at step 805). If the signatures do not match (at step 920), the node ignores the fragments, at step 925. If the signatures do match (at step 920), the receiving node stores the fragments from the aggregate fragment block 35, i.e., goes to step 1400. The buffering of the aggregate fragment blocks 35 with the fragments 205 will be described in detail in FIG. 14.

As stated above, the content 30 is partitioned or divided into fragments 205 for distribution. This is due to the mobility of nodes, e.g., moving vehicles and a lack of sustainable communication opportunities for a long period of time for node. Specifically, content 30 may be too large to send as one large piece of data. The content 30 is divided into smaller fragments 205 for transmission during the short opportunistic connection times. A number of fragments sent in a single connection time or connection window can be adapted to the specific connection time. In other words, the number of fragments 205 sent in an aggregate fragment block 35 is adaptable.

Figure 10:
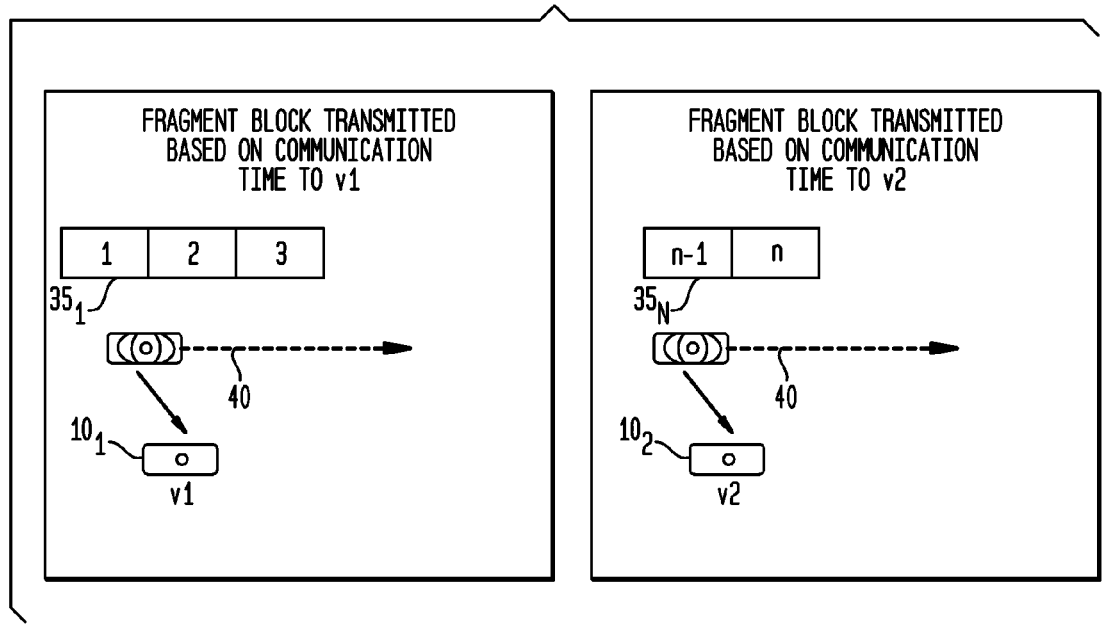
FIG. 10 illustrates two exemplary aggregate fragment blocks.

The basic forwarding unit is a fragment 205. Any number of fragments can be combined to form the aggregate fragment block 35. FIG. 10 illustrates two examples of aggregate fragment blocks $35_1$ and $35_2$. Moving vehicle $10_1$ is traveling along a projected trajectory 40. The expected or predicted communication window or time is V1. Three fragments 205 can be transmitted to moving vehicle $10_1$ during the predicted communication time V1 as a fragment block $35_1$. Moving vehicle $10_2$ is traveling along a projected trajectory 40. The expected or predicted communication window or time is V2. N fragments 205 can be transmitted to moving vehicle $10_1$ during the predicted communication time V2 as a fragment block $35_N$.

The content 30 is divided into fragments 205. A fragment is a minimal transmission size for the content 30. The size of a fragment is dependent on the type of content 30, connection speed, expect velocity of the nodes, e.g., moving vehicles. For example, video content can have a larger fragment size than audio content. In an embodiment, the fragment size is based on shortest connection time expected.

In an embodiment, the content source divides the content 30 into fragments 205 and the fragment size does not change.

In another embodiment, each node, e.g., authorized moving vehicle 10 or RSU 20 can adjust the fragment size based upon updated environmental parameters, such as a change of expect velocity.

Prior to transmission, the fragments 205 are indexed, i.e., a fragment signature 210 is generated and grouped or aggregated together to meet the available connection time between nodes, i.e., fragment block 35.

Figure 11:
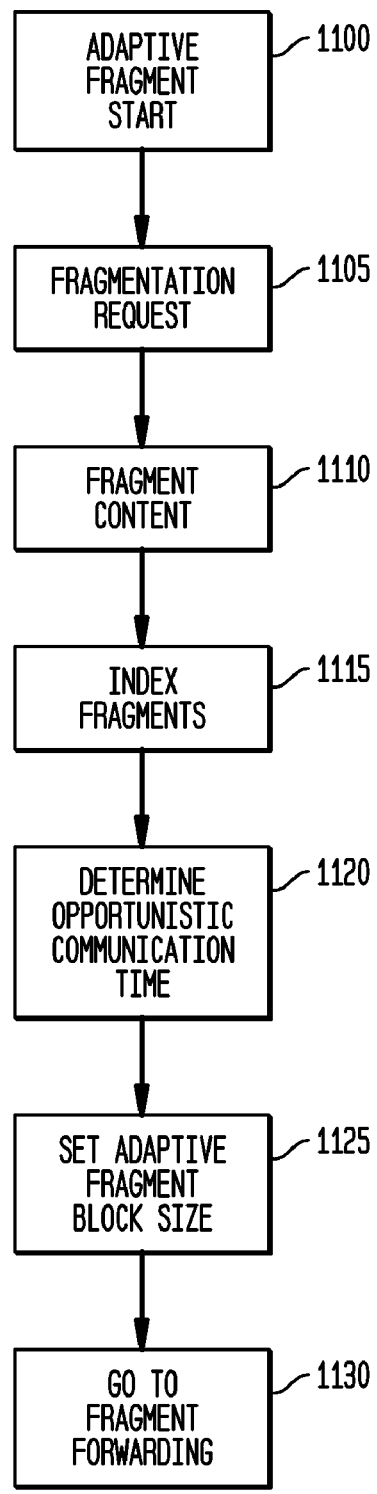
FIG. 11 illustrates a flow chart for an adaptive fragmentation according to an embodiment of the invention.

FIG. 11 illustrates a flow diagram of the adaptive fragmentation method. The process begins at step 1100. At step 1105, a node receives a fragmentation request. The fragmentation request is an internal request from a processor. The content 30 is generated locally and fragmented. The content source fragments the content 30 at step 1110. In an embodiment, the content 35 is partitioned into a consecutive series of equal size fragments 205 of the content. These fragments may or may not overlap. Each fragment can be tagged with a content identifier and a fragment identifier within the fragment signature 210.

The fragments 205 are then indexed. In an embodiment, the index or signature is a hash of the fragment 205. The signature 210 uniquely identifies the fragment. The fragment signature 210 is primarily used to piece together all downloaded fragments 205 into the original content 30. The signature 210 is also used to obtain missing fragments 205 from neighboring nodes. The size of signature 210 is smaller than that of the fragment 205.

At steps 1120 and 1125, the size of the fragment block 35 is determined based upon an opportunistic communication time. Additionally, the size of fragment blocks 35 is based on the application type (from application awareness), the remaining content and its indexing information. The opportunistic communication time is calculated using information exchanged between the nodes regarding the signal strength, speed of the connection between nodes, predicted trajectory of a node and trajectory of the source node. This information is shared between nodes with some exchanged signaling messages, i.e., handshake control messages (node sensing), when they move into communication range. The exchanged information can be used to determine the communication time and thus set the size of the fragment block or aggregated fragments for forwarding. Alternative, each node periodically broadcasts this information.

An opportunistic communication time between using an RSU 20 is more predictable than communication between moving vehicles 10. A RSU 20 is stationary.

Moving vehicles 10 traveling in the same relative direction will have longer communication times than moving vehicles 10 traveling in opposite directions. Longer communication times support larger fragment blocks 35, i.e., more fragments 205 can be aggregated and transmitted. For example, if the connection speed for the link between nodes is 6 kilo-bites per second, the expected communication time between two nodes is 10 seconds, the node determines that 60 kilo-bites can be transmitted. The node groups or aggregates fragments 205 for a fragment block 35 that will have a size less than 60 kilo-bites. After the fragment block 35 is set, the process moves to fragment forwarding (step 1130).

Figure 12:
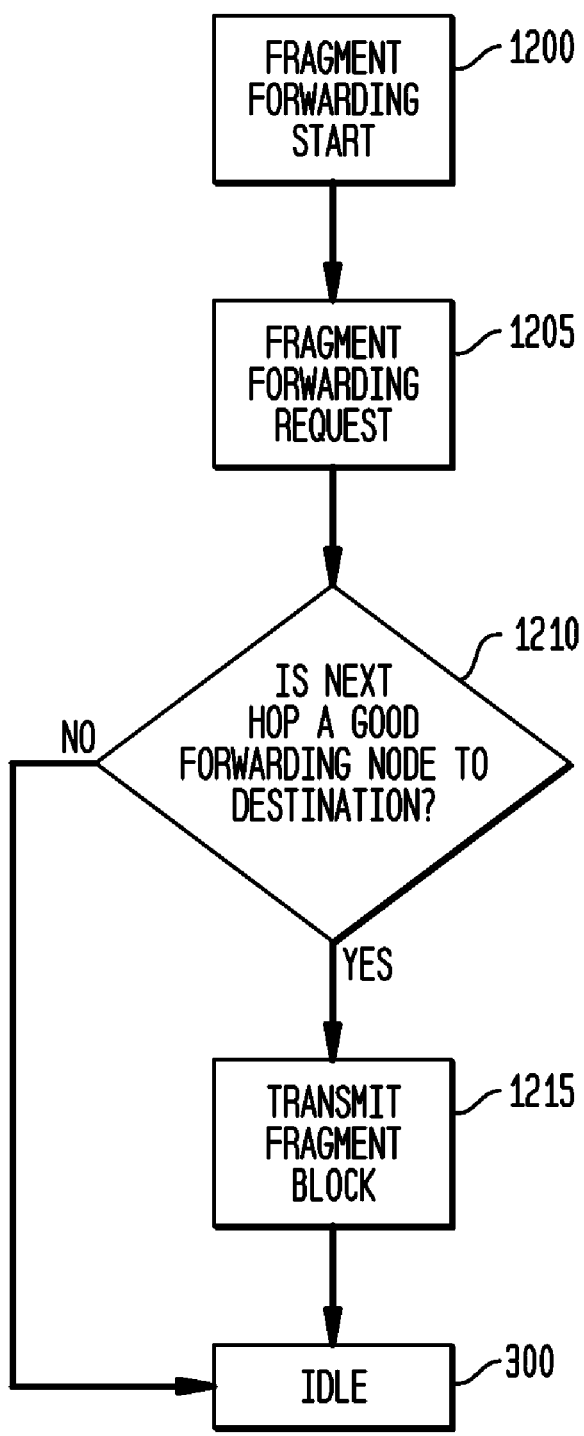
FIG. 12 illustrates a flow chart for fragment forwarding according to an embodiment of the invention.

FIG. 12 illustrates a process of fragment forwarding according to an embodiment of the invention. The forwarding process starts at step 1200. At step 1205, a fragment forwarding request is received. The request can be an internal request in response to the generation of content 30 by a content source (after fragmenting the content). Additionally, the request can be received from another node that is requesting specific fragments. For example, a moving vehicle 10 issues a query for a set of fragments. Each node searches the storage section or memory for the requested content/fragments 30/205. If found, the node, e.g., moving vehicle 10 or RSU 20, attempts to forward the fragments 205 toward the requester. At step 1210, the node e.g., moving vehicle 10 or RSU 20, determines if a neighboring node is a good forwarding node to the requestor. Moving vehicle 10 will use preset criterion to selecting neighboring nodes as forwarding nodes. The forwarding nodes are selected in real-time, when needed. The information used for the selection is received periodically, or during node sensing, i.e., sensing a neighboring node. In an embodiment, a predicted trajectory for all neighboring node is used to select the forwarding nodes. The node, e.g., moving vehicle 10 or RSU 20, receives position information regarding all nodes within radio range. Forwarding of the fragment block 35 to a neighboring node is done only when the nearby node's trajectory will be moving in a direction towards the requestor, i.e., between the node and the requester. In another embodiment, a node will only forward the fragment block 35 if the node is moving in (or located within) a predefined content trajectory (neighboring node within the content trajectory). The content trajectory is defined by the content source (node that created the content). The content trajectory eliminates the broadcasting of non-relevant content to nodes outside a content relevant area. For example, traffic information or accident information is only relevant in a specific area.

Additionally, the forwarding node is selected based upon an expected communication time. The fragment block 35 can be adjusted to fit within the expected communication time between a sending node and a forwarding node (steps 1120 and 1125 repeated). If the node is a good forwarding node, the fragment block 35 is broadcast, at step 1215. If there are no neighboring nodes that are a good forwarding node, the fragment block 35 is not broadcast and the node returns to an idle state (state 300).

The fragments 205 can be proactively delivered to a sub-set of nodes in the network, in advance of a need. These nodes are selected to maximize delivery of the content 30 and to maintain the content 30 within the content trajectory area. These nodes are used to propagate content 30 in a specific direction. The node or deposit nodes are special forwarding nodes. The deposit point is selected based upon a content trajectory and/or location of the node, e.g., geographic and temporal relevance of the content.

Figure 13:
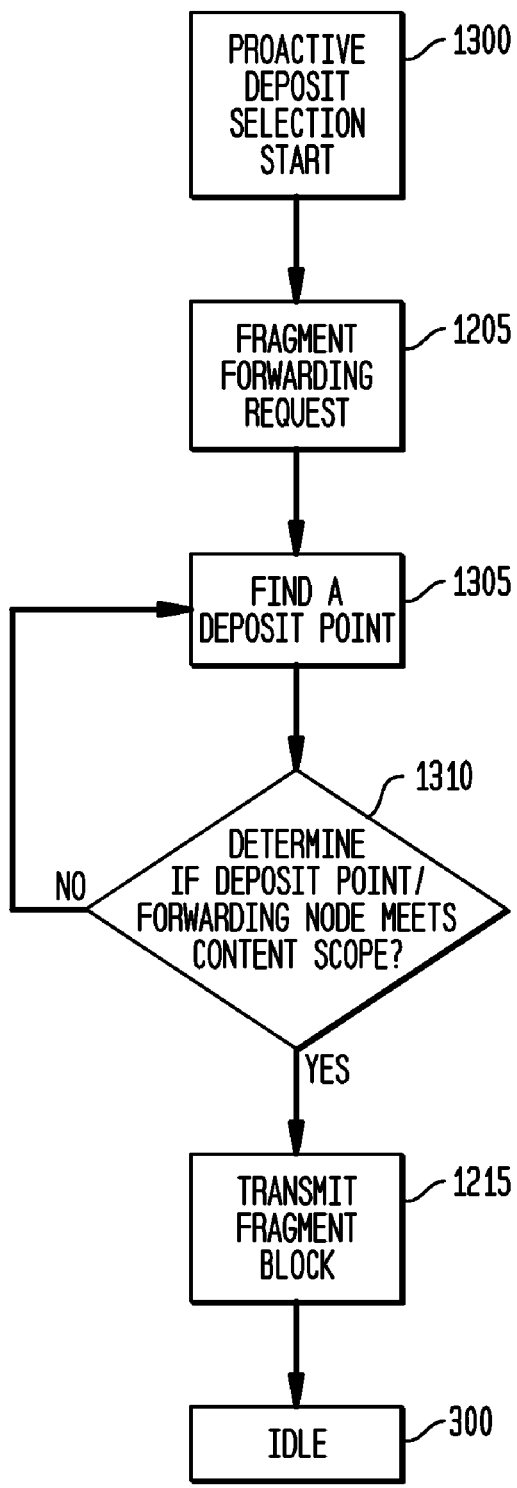
FIG. 13 illustrates a flow chart for a proactive deposit point selection according to an embodiment of the invention.

FIG. 13 illustrates a method for selecting deposit nodes according to an embodiment of the invention. The process begins a step 1300. The node awakes from an idle state. A fragment forwarding request is received at step 1205. The fragment forwarding request is similar to the request described in FIG. 12. At step 1305, a potential deposit point is found. Specifically, a potential deposit point is any neighboring node, i.e., any node within a radio range. Potential deposit point is found by receiving information exchanged via handshake control. This information includes at least an identifier for the node and its speed and direction. The node selects one of the neighboring nodes of evaluation. For first selected neighboring node, a node determines if the selected neighboring node is within the content trajectory. The node compares the location information, e.g., speed and direction and the content trajectory at step 1310. The node predicts a trajectory for the selected neighboring node. The predicted trajectory is compared with the content trajectory. If neighboring node is predicted to remain within a relevant location, i.e., within the content trajectory for an extended period of time, the neighboring node becomes a deposit point. If, on the other hand, the neighboring node is not predicted to remain within the relevant location, i.e., outside a content trajectory, the neighboring node is not selected as a deposit point and the node repeats the evaluation process for another neighboring node (returns to step 1305).

In another embodiment, an RSU 20 is automatically selected as the deposit points.

Once a deposit point is selected and set, the fragment block 35 is broadcast to the selected deposit point at step 1215. The node returns to an idle state (state 300).

When fragments 205 or a fragment signature 210 is initially received, the data is temporarily stored in cache, e.g., cache table 1500. However, content 30 cannot be access until all of the fragments 205 are received and assembled using the fragment signature. Obtaining all of the fragments to recover the original content may take time.

If not all fragments 205 are received within a relevant period of time, then the content 30 may become outdated. In an embodiment of the invention, the cache table, e.g., 1500, in destination nodes or forwarding nodes, includes a temporal limitation for the storage of the fragments. The limitation can be based upon content scope, content trajectory, relevant time, and number of queries for the specific fragment, e.g., the number of duplicate fragments already transmitted and location of the node. Additionally, a determination of a good cache time may be based on the road condition and trajectory of the vehicle compared to destination's radius of presence.

If large cache times are used for fragments 205, the nodes, e.g., moving vehicles 10 and 20 hold a large amount of content 30. This reduces the need to exchange content 30 often. However, this results higher storage requirements. In addition, short duration information is outdated very quickly and takes up unnecessary space. Furthermore, a large number of fragments are forwarded. If short cache times are used for fragments 205, then content sharing is increased and wireless overhead increases.

Figure 14:
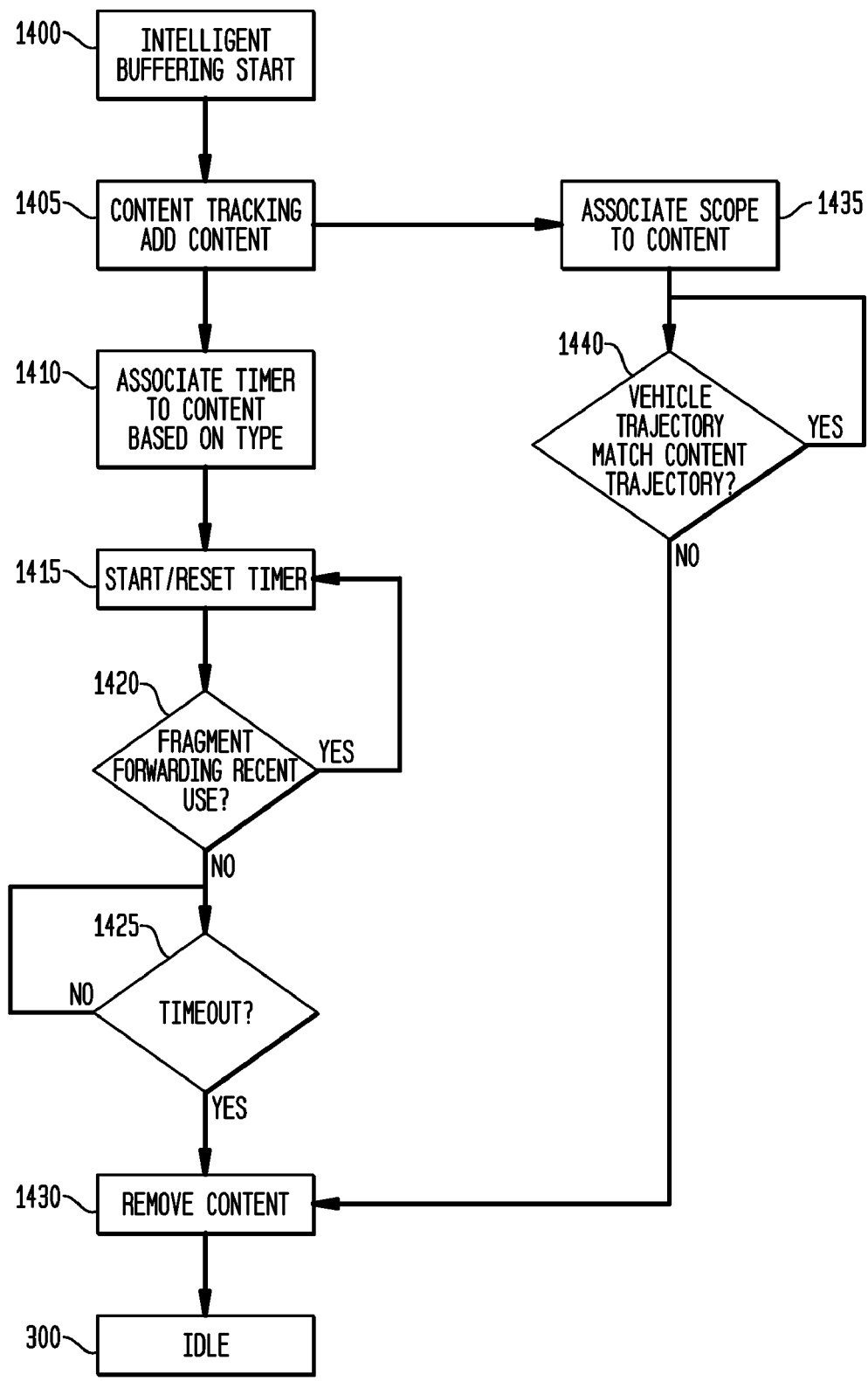
FIG. 14 illustrates a flow chart for buffering fragments according to an embodiment of the invention.

FIG. 14 illustrates a method of buffering the fragments 205 according to an embodiment of the invention. The process begins at step 1400. At step 1405, a fragment block 35 is received containing fragments 205. Each fragment is stored. In an embodiment, each transmitted fragment includes a timestamp. The timestamp is the time when the fragment 205 was originated, i.e., originally generated by the originating node. The timestamp is used for content lifetime, i.e., fragment lifespan. In another embodiment, the fragment 205 also includes a content trajectory or information regarding the forwarding direction requirements, content location relevancy. In another embodiment, the fragment 205 includes information regarding the type of content. This information is used by a receiving node to group content with similar event locations or forwarding direction requirements together in a cache table 1500. An example of a cache table 1500 is depicted in FIG. 15. In another embodiment, the fragment 205 includes priority information related to a priority of the fragment. A high priority fragment will be transmitted first during shorter connection times such that the required content is exchanged while in longer connections times some lower priority content is also exchanged.

Additionally, the fragment 205 can include more than one of the above-identified parameters, i.e., priority, scope, location, lifespan.

In an embodiment, the originator or source node of the fragment 205 set the parameters, i.e., indexes the fragment. A recipient node extracts the index information and adds the information to the cache table 1500. For example, if the fragment 205 includes, scope and location information, the node associates the scope information with the fragment 205 in the cache table 1500, at step 1435. The content 30, e.g., fragments 205 remain in the cache table 1500 as long as the node, e.g., moving vehicle 10 remains within the location or content trajectory. The node, e.g., moving vehicle 10 periodically determines if its current position or predicted trajectory is within the content trajectory or scope (step 1440). Specifically, the node, e.g., moving vehicle 10 compares its location with the scope or content trajectory information in the cache table 1400. If there is a match, i.e., still within the content trajectory, the fragments 205 are kept. On the other hand, if the node, e.g., moving vehicle 10 is outside the content trajectory, i.e., predicted trajectory not in the content trajectory, the content 30 (fragment 205) is removed or purged from the cache table 1500 at step 1430.

If at step 1405, the fragment 205 includes information regarding the lifespan for the fragment 205, the lifespan is associated with the fragment 205 in the cache table 1500 at step 1410. Once the fragment 205 is stored in the cache table 1500, a timing section 115 is set with the associated lifespan and started, at step 1415. Each time the fragment 205 is reused, e.g., forwarded, the timing section 115 is reset. The node, e.g., moving vehicle 10 or RSU 20 determines if the fragment 205 has been recently forwarded, at step 1420. If the fragment has been recently forwarded, the timing section 115 is reset to the associated lifespan, at step 1415.

If the fragment has not been recently forwards, the node, e.g., moving vehicle 10 or RSU 20, determines if the timing section 115 has expired, at step 1425. If the timing section 115 expires, the content 30 (fragment 205) is removed or purged from the cache table 1500 at step 1430.

In another embodiment, the node, e.g., moving vehicle 10 or RSU 20, can remove or pulse the cache table 1500, if not all fragments 205 of a specific content 30 are received within a predefined period of time. Missing fragments are determined by examining the content index or signature 210 for all of the fragments.

As depicted in FIG. 15, the cache table 1500 includes a plurality of content 30. Each content 30 is associated with different cache times and scopes.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for transmitting data in vehicular network comprising:

receiving a request for content from a wireless device associated with a moving vehicle, the request including a list of fragment index information from a fragment signature, the moving vehicle's current position, a direction of motion and speed of the moving vehicle to estimate network connection time between the moving vehicle and a second wireless device associated with a second moving vehicle;

determining a communication window between the wireless device associated with the moving vehicle and the second wireless device associated with the second moving vehicle that received the request;

grouping a plurality of fragments corresponding to the list of fragment index information together into an aggregate fragment block; and forwarding the aggregate fragment block to the wireless device associated with the second moving vehicle.

2. The method for transmitting data according to claim 1, further comprising receiving a request for the fragment signature; and broadcasting a response comprising the fragment signature.

3. The method for transmitting data according to claim 2, further comprising determining a predicted trajectory of the moving vehicle.

4. The method for transmitting data according to claim 3, wherein the predicted trajectory of the moving vehicle is inferred from a location of each road-side unit (RSU) in radio communication with the moving vehicle.

5. The method for transmitting data according to claim 1, wherein a number of fragments grouped into the aggregate fragment block depends on the communication window.

6. The method for transmitting data according to claim 1, further comprising:
broadcasting the fragment signature.

7. The method for transmitting data according to claim 1, further comprising:
dividing the content into the plurality of fragments; and
generating the fragment signature that contains fragment index information regarding each fragment, where each fragment is unambiguously identified by its signature.

8. The method for transmitting data according to claim 7, further comprising storing the fragment index information in memory.

9. The method for transmitting data according to claim 1, further comprising:
verifying an authenticity of each of the forwarded fragments; and
storing each of the forwarded fragments, based upon the verification, where each of the received fragments is identified by the fragment index information in the fragment signature.

10. The method for transmitting data according to claim 9, further comprising determining local storage lifespan, scope and trajectory for each fragment.

11. The method for transmitting data according to claim 9, further comprising assigning a fragment trajectory for each fragment.

12. The method for transmitting data according to claim 1, wherein said grouping is based upon a priority, time, scope and trajectory of the target node and trajectory of the fragment, for each fragment.

13. The method for transmitting data according to claim 1, further comprising:
determining if the fragments corresponding to the list of fragment index information in the request are stored locally in the wireless communication device;
forwarding the request to a neighboring vehicle if at least one fragment is not locally available.

14. A method for transmitting data in vehicular network comprising:
receiving a request for content from a wireless device associated with a moving vehicle, the request including a list of fragment index information from a fragment signature, the moving vehicle's current position, a direction of motion and speed of the moving vehicle to estimate network connection time between the moving vehicle and a second wireless device associated with a second moving vehicle;
determining a communication window between the wireless device associated with the moving vehicle and the second wireless device associated with the second moving vehicle that received the request;
grouping a plurality of fragments corresponding to the list of fragment index information together into an aggregate fragment block; and
forwarding the aggregate fragment block to the wireless device associated with the second moving vehicle, wherein fragment size of a fragment is variable based upon an average communication window and bandwidth of wireless network.

15. A method for transmitting data in a mobile ad-hoc network comprising:
dividing data into fragments;
creating a fragment signature containing a fragment index;
broadcasting, periodically the fragment signature, a speed, and a direction of travel of the vehicle;
receiving a request for fragment listed in the fragment signature, where a number of fragments is based upon an estimated communication window determined from at least the speed and direction of travel in the periodic broadcast;
grouping the fragments into aggregate fragment blocks, each having a block size determined by the window of communication; and
transmitting the aggregate fragment blocks.

* * * * *

UNITED STATES PATENT AND TRADEMARK OFFICE
CERTIFICATE OF CORRECTION

PATENT NO.        : 8,295,257 B2                                   Page 1 of 1
APPLICATION NO.   : 12/403571
DATED             : October 23, 2012
INVENTOR(S)       : Chen et al.

It is certified that error appears in the above-identified patent and that said Letters Patent is hereby corrected as shown below:

In the Drawings

In Fig. 3, Sheet 4 of 15, delete "REQUESTER SPEED," and insert -- REQUESTOR SPEED, --, therefor.

In the Specification

In Column 4, Line 15, delete "Media" and insert -- (Media --, therefor.

In Column 9, Line 53, delete "if" and insert -- it --, therefor.

In Column 12, Line 3, delete "requester." and insert -- requestor. --, therefor.

In Column 12, Line 18, delete "requester." and insert -- requestor. --, therefor.

Signed and Sealed this
Twenty-first Day of October, 2014

Michelle K. Lee
*Deputy Director of the United States Patent and Trademark Office*